United States Patent
Osawa et al.

(10) Patent No.: US 11,595,904 B2
(45) Date of Patent: Feb. 28, 2023

(54) USER TERMINAL AND RADIO COMMUNICATION METHOD

(71) Applicant: NTT DOCOMO, INC., Tokyo (JP)

(72) Inventors: Ryosuke Osawa, Tokyo (JP); Yuichi Kakishima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 216 days.

(21) Appl. No.: 16/630,189

(22) PCT Filed: Jul. 12, 2017

(86) PCT No.: PCT/JP2017/025446
§ 371 (c)(1),
(2) Date: Jan. 10, 2020

(87) PCT Pub. No.: WO2019/012635
PCT Pub. Date: Jan. 17, 2019

(65) Prior Publication Data
US 2021/0153134 A1 May 20, 2021

(51) Int. Cl.
*H04W 52/14* (2009.01)
*H04W 52/36* (2009.01)

(52) U.S. Cl.
CPC ....... *H04W 52/143* (2013.01); *H04W 52/365* (2013.01); *H04W 52/367* (2013.01)

(58) Field of Classification Search
CPC ............. H04W 52/143; H04W 52/365; H04W 52/367
See application file for complete search history.

(56) References Cited

U.S. PATENT DOCUMENTS

2014/0204919 A1   7/2014 Chen et al.
2017/0048807 A1*  2/2017 Wang ................ H04W 52/367

FOREIGN PATENT DOCUMENTS

| EP | 3002976 A1 | 4/2016 | |
| JP | 2008295032 A | * 12/2008 | |
| WO | WO-2011030891 A | * 3/2011 | .......... H04W 52/242 |

OTHER PUBLICATIONS

International Search Report issued in Application No. PCT/JP2017/025446, dated Aug. 22, 2017 (5 pages).
Written Opinion issued in International Application No. PCT/JP2017/025446, dated Aug. 22, 2017 (4 pages).

(Continued)

*Primary Examiner* — Elton Williams
(74) *Attorney, Agent, or Firm* — Osha Bergman Watanabe & Burton LLP

(57) ABSTRACT

A user terminal according to one aspect of the present invention is characterized by having a receiving section that receives a power control ID, a control section that controls transmit power according to a transmit power parameter set specified by the power control ID, and a transmitting section that transmits a signal corresponding to an object set specified by the power control ID, using the transmit power. According to one aspect of the invention, it is possible to suppress a reduction in communication throughput, even in the case of using beam specific transmit power control.

7 Claims, 8 Drawing Sheets

(56) References Cited

OTHER PUBLICATIONS

3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
Extended European Search Report issued in European Application No. 17917367.9, dated Jan. 25, 2021 (8 pages).
Office Action issued in European Application No. 17917367.9, dated Mar. 24, 2022 (5 pages).
Office Action issued in Indian Application No. 202037002706 dated Feb. 24, 2022 (5 pages).
Office Action issued in Israeli Application No. 271936 dated Aug. 15, 2022 (13 pages).

* cited by examiner

USER TERMINAL AND RADIO COMMUNICATION METHOD

TECHNICAL FIELD

The present invention relates to a user terminal and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of higher capacity, more sophistication and the like than LTE (LTE Rel.8, 9), LTE-A (LTE-Advanced, LTE Rel.10, 11, 12, 13) has been specified.

Successor systems (e.g., also referred to as FRA (Future Radio Access), 5G (5th generation mobile communication system), 5G+(plus), NR (New Radio), NX (New radio access), FX (Future generation radio access), LTE Rel.14 or 15 onward and the like) to LTE have also been studied.

In existing LTE (e.g., LTE Rel.13), a user terminal (UE: User Equipment) performs transmission on uplink, using Discrete Fourier Transform Spread Orthogonal Frequency Division Multiplexing (DFT-S-OFDM).

CITATION LIST

Non-Patent Literature

[Non-Patent Literature 1] 3GPP TS 36.300 V.8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

As transmit power control in future radio communication systems (e.g., NR), studied are beam specific power control, waveform specific power control, service type specific power control and the like.

However, when each of these types of specific power control is applied independently, it is necessary to configure parameters for respective specific power control for UE, a communication amount required for signaling is enormous, and there is a problem that communication throughput deteriorates.

Therefore, it is an object of the present invention to provide a user terminal and radio communication method capable of suppressing a reduction in communication throughput, even in the case of using beam specific transmit power control.

Solution to Problem

A user terminal according to one aspect of the present invention is characterized by having a receiving section that receives a power control ID, a control section that controls transmit power according to a transmit power parameter set specified by the power control ID, and a transmitting section that transmits a signal corresponding to an object set specified by the power control ID, using the transmit power.

Advantageous Effects of Invention

According to the present invention, it is possible to suppress a reduction in communication throughput, even in the case of using beam specific transmit power control.

DESCRIPTION OF EMBODIMENTS

Figure 1:
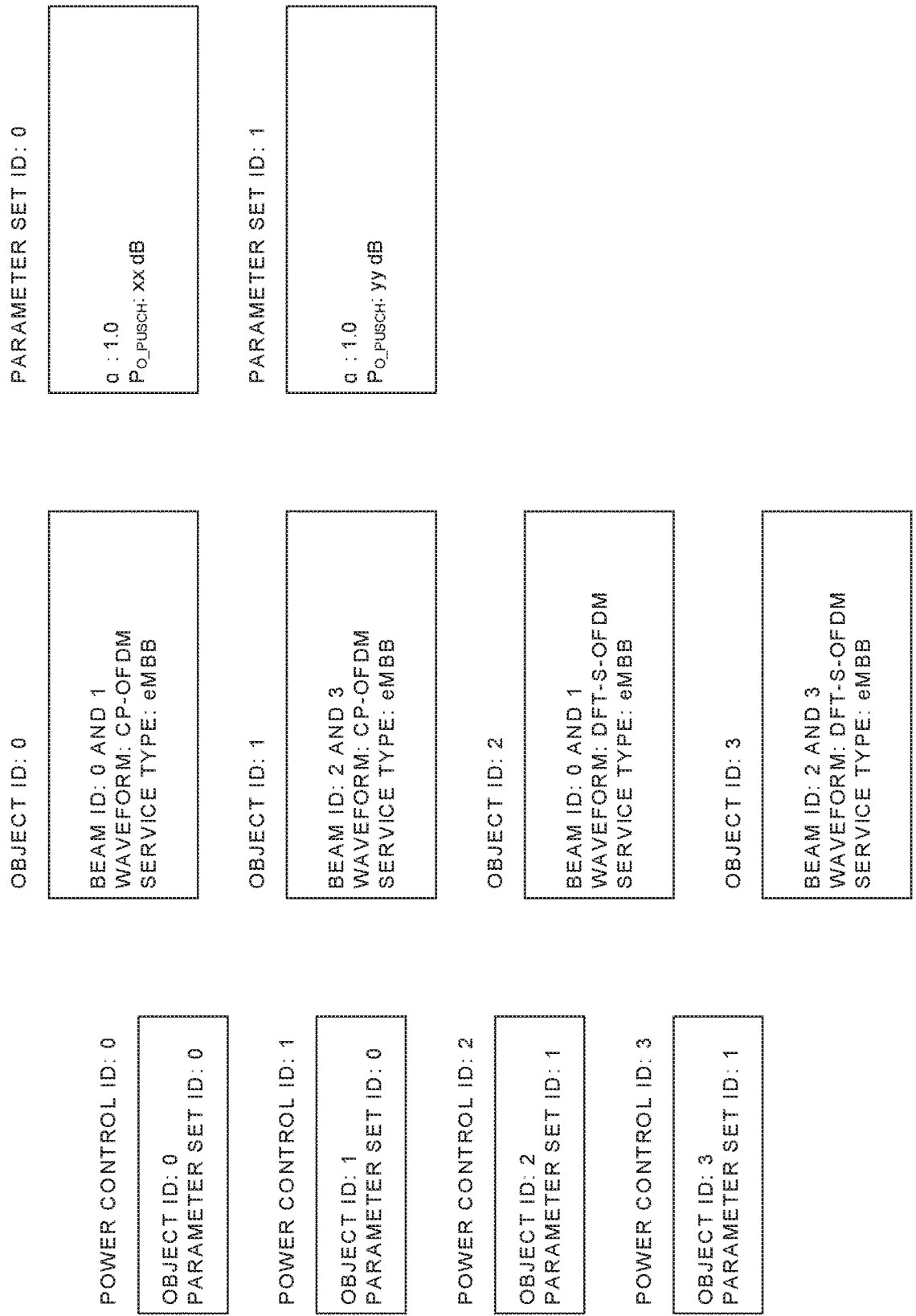
FIG. 1 is a diagram showing one example of information associated with each of power control ID, object ID and parameter set ID in Embodiment 1.

In NR, on uplink at least for use in eMBB (enhanced Mobile Broad Band), it is scheduled to support two kinds of different transmission schemes (also called multiplexing scheme, modulation scheme, access scheme, waveform scheme, etc.)-based waveforms. The two kinds of waveforms are specifically a Cyclic Prefix Orthogonal Frequency Division Multiplexing (CP-OFDM)-based waveform, and a Discrete Fourier Transform Spread Orthogonal Frequency Division Multiplexing (DFT-S-OFDM)-based waveform.

In addition, the CP-OFDM waveform may be called a waveform of multicarrier transmission scheme, and the DFT-S-OFDM-based waveform may be called a waveform of single-carrier transmission scheme. Further, the waveform may be characterized by the presence or absence of application of DFT precoding (spreading) to the OFDM waveform. For example, CP-OFDM may be called a waveform (signal) to which DFT precoding is not applied, and DFT-S-OFDM may be called a waveform (signal) to which DFT precoding is applied.

In NR, since it is expected to switch between CP-OFDM and DFT-S-OFDM to use, it is considered that the waveform is switched during communication. For example, a network (base station (also called gNB), etc.) may instruct UE to use (or switch the waveform) the CP-OFDM-based waveform or the DFT-S-OFDM-based waveform. The instruction may be notified to the UE, by higher layer signaling, physical layer signaling (e.g., Downlink Control Information (DCI)) or combination thereof.

For example, RRC (Radio Resource Control) signaling, MAC (Medium Access Control) signaling (e.g., MAC control element (MAC CE (Control Element)), broadcast information (e.g., MIB (Master Information Block), SIB (System Information Block)) and the like may be used in the higher layer signaling.

It is studied using the CP-OFDM waveform or the DFT-S-OFDM waveform for single-stream (single layer) transmission and multi-stream (multi-layer, MIMO (Multi Input Multi Output)) transmission. In addition, the DFT-S-OFDM waveform may be limited to only single-stream transmission to use.

In addition, open-loop transmit power control and closed-loop transmit power control is supported on uplink of existing LTE (e.g., LTE Rel.13) using DFT-S-OFDM. In uplink transmit power control (e.g., transmit power control of an uplink shared channel (PUSCH: Physical Uplink Shared Channel)) of LTE, an error of open-loop control is corrected by closed-loop control using a TPC command received from the base station.

For example, in existing LTE, transmit power $P_{PUSCH,c}(i)$ of a PUSCH in a subframe i of a serving cell c is expressed by the following equation 1.

[Mathematics 1]

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}$$ (Equation 1)

In Equation 1, $P_{CMAX,c}(i)$ is maximum transmission-capable power (allowable maximum transmit power) of UE, $M_{PUSCH,c}(i)$ is a transmission bandwidth (the number of resource blocks) of the PUSCH, j is an index indicative of a scheduling type of the PUSCH, $P_{O\_PUSCH,c}(j)$ is a value indicative of target received power equivalent of the PUSCH, $\alpha_c(j)$ is a coefficient to multiply by $PL_c$, $PL_c$ is downlink path loss calculated by the UE, $\Delta_{TF,c}(i)$ is an offset value corresponding to a transmission format, and fc (i) is a correction value (e.g., cumulative value of TPC commands, offset value based on the TPC command, etc.) based on the transmit power control (TPC) command. For example, $P_{O\_PUSCH,c}(j)$, $\alpha_c(j)$ and the like may be notified by broadcast information.

In Equation 1, parameters concerning open-loop control are $M_{PUSCH,c}(i)$, $P_{O\_PUSCH,c}(j)$, $\alpha_c(j)$, $PL_c$ and $\Delta_{TF,c}(i)$. Further, a parameter concerning closed-loop control is $f_c(i)$. In other words, transmit power of the PUSCH is determined by open-loop control and closed-loop control with maximum transmission-capable power of UE being the upper limit.

Hereinafter, in the present Description, a notation of a part (e.g., "$_c$", "(i)", "(j)", etc.) of the parameter will be omitted to describe, and it is possible for a person skilled in the art to understand meaning by referring to parameters of existing LTE and the like.

In addition, with respect to other uplink signals (e.g., uplink control channel (PUCCH: Physical Uplink Control Channel), uplink measurement reference signal (SRS: Sounding Reference Signal), etc.), although used parameters are different, transmit power is determined similarly based on open-loop control, closed-loop control and the like.

On the other hand, in NR, it is studied supporting open-loop transmit power control and closed-loop transmit power control. Herein, it is considered that transmit power control of the CP-OFDM-based waveform on uplink is also performed in an Equation 1-like form as the DFT-S-OFDM-based waveform.

Further, beam specific power control is studied as transmit power control in NR. In beam specific power control, it is possible to perform power control on a beam-by-beam basis such that path loss for each beam is considered. In addition, the "beam" may be read with a waveform, layer, layer group, panel, beam group, beam pair link, service type and the like.

For example, also studied is waveform specific power control, service type specific power control and the like for changing at least a part of parameters (e.g., $P_c$, $\alpha$) of power control corresponding to the waveform, service type and the like.

Herein, as the service type, for example, NR expects eMBB (enhanced Mobile Broad Band), mMTC (massive Machine Type Communication), URLLC (Ultra Reliable Low Latency Communications), and the like.

However, when each of these types of specific power control is applied independently, since it is necessary to configure parameters for respective specific power control for UE, a communication amount required for signaling is enormous, and there is a problem that communication throughput deteriorates. For example, in the case of using beam specific, waveform specific and service type specific power control, most simply, it is necessary to configure the enormous number of (combinations of) parameters corresponding to the number of beams×the number of waveforms×the number of service types.

Therefore, the inventors of the present invention noted the method of suitably controlling signaling even in the case where specific power control tied to a certain parameter is defined with respect to a plurality of parameters, and found out the present invention.

Embodiments according to the present invention will be described below in detail with reference to drawings. A radio communication method according to each of the Embodiments may be applied alone, or may be applied in combination.

In addition, the wording of "ID" emerging in the following description may be read with at least one of index, identifier and indicator. Further, "signal" may read with "channel", and "signal and/or channel".

(Radio Communication Method)

Embodiment 1

In Embodiment 1, UE determines a transmit power parameter used in transmit power control of a certain signal, based on a correspondence relationship between a transmit power parameter set and an object set described below.

The transmit power parameter set includes a value of one or more transmit power parameters. The transmit power parameter may be a parameter used in transmit power calculation of a signal, and for example, may include a value of one or more parameters ($P_O$, $\alpha$, etc.) used in Equation 1.

The transmit power parameter set may be specified by a certain index (for example, which may be called "transmit power parameter set ID", "power control parameter set ID", "parameter set ID" and the like).

The object set includes a value of one or a plurality of objects (may be called dimensional object). For example, the object set may include a value (i.e., a value to identify specific power control on which value of what parameter) of a certain object in the case where power control specific to the certain object is defined.

The object may be a parameter for characterizing a transmission signal, and for example, may be a parameter which is used in generation and/or transmission of a signal and which is not included in the transmit power parameter set. Further, in the case where "XX specific power control" is defined by specification, the object may be the "XX".

For example, the object may include a beam, waveform, layer, layer group, panel, beam group, beam pair link, service type, numerology (subcarrier spacing (SCS): Sub-Carrier Spacing) etc.), frequency (e.g., carrier frequency), time, code (e.g., sequence), codebook, DCI format and the like.

The object set may be specified by a certain index (for example, which may be called "object set ID", "object ID" and the like).

The above-mentioned correspondence relationship may be determined by a certain index (e.g., which may be called "power control ID") associated with the object ID and/or the transmit power parameter set ID. It is preferable that the power control ID and object ID correspond to each other uniquely, but the same object ID may be associated with different power control IDs. In this case, with respect to the same object set, it is possible to switch between different transmit power control sets to use.

FIG. 1 is a diagram showing one example of information associated with each of the power control ID, object ID and parameter set ID in Embodiment 1. This example illustrates an example of defining four power control IDs, four object IDs, and two parameter set IDs, but the number of every IDs is not limited thereto.

In this example, the power control ID is associated with the object ID and parameter set ID. For example, power control ID0 corresponds to object ID0 and parameter set ID0.

Further, the object ID is associated with a beam, waveform, and service type. For example, in object ID0, the beam ID is "0" and "1", the waveform is CP-OFDM, and the service type corresponds to a signal of eMBB.

Further, the parameter set ID is associated with α and $P_{O\_PUSCH}$. For example, in power control of a signal that corresponds to the parameter set ID0, "1.0" is used as a, and xx dB is used as $P_{O\_PUSCH}$.

Figure 2:
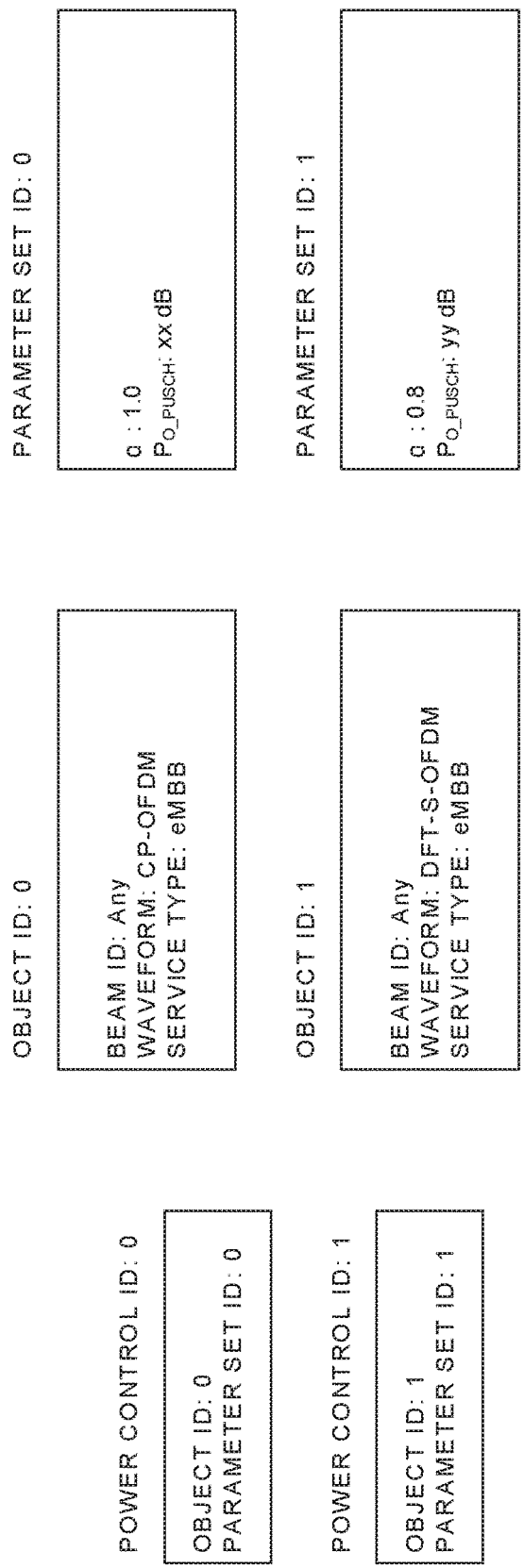
FIG. 2 is a diagram showing another example of information associated with each of power control ID, object ID and parameter set ID in Embodiment 1.

FIG. 2 is a diagram showing another example of information associated with each of the power control ID, object ID and parameter set ID in Embodiment 1. This example illustrates an example of defining two power control IDs, two object IDs, and two parameter set IDs, but the number of every IDs is not limited thereto.

This example is similar to the example of FIG. 1, and differs in the respect that "Any" is configured in the object. By configuring "Any" for a part of objects, since it is possible to match with all elements of the object, it is possible to effectively decrease the number of object IDs. In addition, with respect to the fact that a certain object included in an object set specified by some object ID is "Any", the fact corresponds to that the object set does not include configuration of the certain object.

In this example, for example, with respect to any beam, object ID0 corresponds to a signal where the waveform is CP-OFDM, and the service type is eMBB.

In addition, with respect to the object, as well as "Any", it may be possible to configure "Odd", "Even", group of certain indexes, group meeting a certain rule and the like.

[Configuration of Correspondence Relationship]

In addition, information on the correspondence relationship between the object ID and the object set may be notified to the UE by higher layer signaling (e.g., RRC signaling, SIB, etc.), physical layer signaling (e.g., DCI) or combination thereof, or may be defined by specifications.

Further, information on the correspondence relationship between the parameter set ID and the transmit power parameter set may be notified to the UE by higher layer signaling (e.g., RRC signaling, SIB, etc.), physical layer signaling (e.g., DCI) or combination thereof, or may be defined by specifications.

The object associated with the object ID or the transmit power parameter associated with the parameter set ID may be specified by an ID, index (e.g., beam ID, beam pair link (beam pair) ID) and the like.

Further, information on the correspondence relationship of the power control ID with the object ID and parameter set ID may be notified to the UE by higher layer signaling (e.g., RRC signaling, SIB, etc.), physical layer signaling (e.g., DCI) or combination thereof, or may be defined by specifications.

In addition, the direct correspondence relationship between the power control ID and the object set may be configured by higher layer signaling and the like, and the direct correspondence relationship between the power control ID and the transmit power control set may be configured by higher layer signaling and the like.

Further, default values with respect to a part or all of parameters (objects) may be configured by higher layer signaling (e.g., broadcast information) and the like, or may be defined by specifications.

Furthermore, with respect to at least one of the power control ID, object ID and parameter set ID, the number of configured IDs, the maximum number of IDs and the like may be notified to the UE, by higher layer signaling (e.g., RRC signaling, SIB, etc.), physical layer signaling (e.g., DCI) or combination thereof, or may be defined by specifications.

[Operation of UE]

In the case where at least one of the power control ID, object ID and parameter set ID is notified (designated), the UE may identify other IDs associated with the notified ID, and using an object set and transmit power parameter set based on these IDs, may perform power control of a transmission signal. For example, in the case of receiving a UL grant including a power control ID, the UE may perform power control of an uplink shared channel (e.g., PUSCH) scheduled by the grant, by referring to the power ID.

Further, in the case where the object set or the transmit power parameter set is notified, the UE may identify an object ID or parameter set ID that corresponds to the notified parameter set, identify other IDs (power control ID, etc.) associated with the specified ID, and using an object set and transmit power parameter set based on these IDs, may perform power control of a transmission signal.

In addition, in the case where a value of each object ID, object that corresponds to a parameter set ID, or transmit power parameter does not overlap with one another and the like, at least one of the power control ID, object ID and parameter set ID may be specified, by notifying of a value of a particular object and/or transmit power parameter.

The UE may calculate a power headroom report (PHR) for each power control ID to report to the base station.

According to Embodiment 1 as described above, for example, by configuring a transmit power parameter, and an object set adapted to the parameter (e.g., combination of beam, waveform and service type) independently, and further, configuring associations thereof separately, it is possible to perform flexible transmit power control, while suppressing a signaling amount.

Embodiment 2

Embodiment 2 describes whether a correction value (e.g., $f_c$ (i) of Equation 1) based on the TPC command is independent or is used commonly, in transmit power control corresponding to each power control ID.

[In the Case of being Independent for Each Power Control ID]

In the case where the correction value (cumulative value) based on the TPC command is independent for each power control ID, the UE may store the correction value independently for each power control ID, based on the notified TPC command. The gNB may transmit the TPC command that explicitly or implicitly corresponds to one or a plurality of power control IDs to the UE. According to this configuration, in the case of using a plurality of beams at the same time, for example, the case where multi-panel transmission is used, it is possible to easily adjust to suitable power for each beam.

The TPC command corresponding to the power control ID may be notified by higher layer signaling (e.g., MAC signaling, (MAC header, MAC CE, etc.), or may be notified by physical layer signaling (e.g., DCI).

For example, in the case where the number of power control IDs (or the maximum number of power control IDs) is set or defined by specifications, respective TPC commands in descending order or ascending order of power control IDs may be included in MAC signaling (or DCI) to notify.

Further, the TPC command and power control ID associated with the TPC command may be included in MAC signaling (or DCI) to notify. In addition, in the case where TPC commands that correspond to a plurality of power control IDs is the same value, one TPC command may be included in one MAC signaling (or DCI) to notify.

[In the Case of being Common Among Power Control IDs]

In the case where the correction value (cumulative value) based on the TPC command is common among a plurality of power control IDs, the UE may store the correction value common to the power control IDs, based on the notified TPC command.

In the case where the UE is notified of a power control ID different from the power control ID currently used in power control (i.e., the power control ID is changed), the UE may reset the correction value common to the power control IDs (i.e., may made a certain value (e.g., "0"), or may continue the value without change (may use continuously).

According to Embodiment 2 as described above, even in the case of using a plurality of power control IDs, it is possible to suitably perform transmit power control meeting target SINR.

(Radio Communication System)

A configuration of a radio communication system according to one Embodiment of the present invention will be described below. In the radio communication system, communication is performed using any of the radio communication method according to each above-mentioned Embodiment of the invention or combination thereof.

Figure 3:
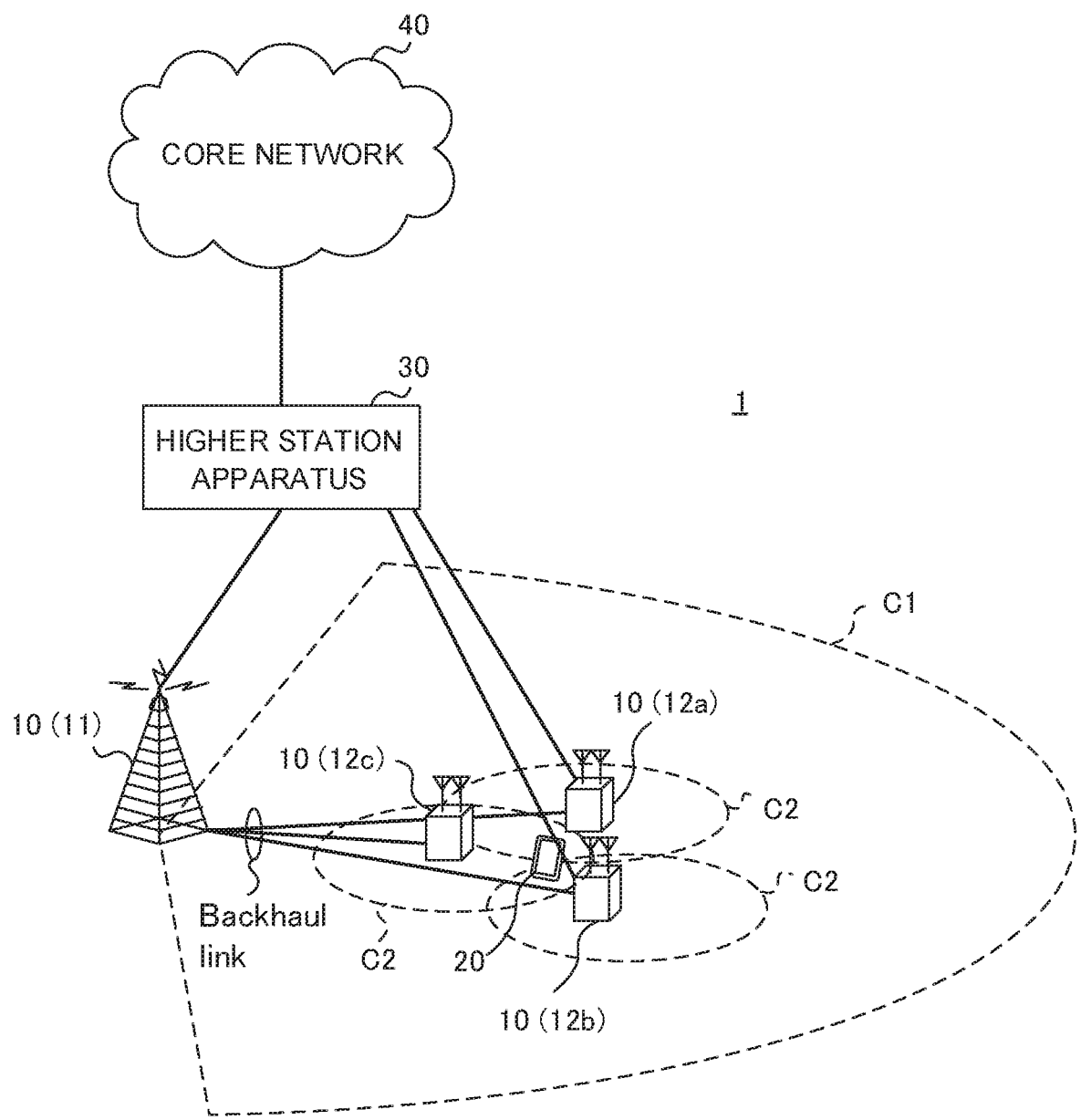
FIG. 3 is a diagram showing one example of a schematic configuration of a radio communication system according to one Embodiment of the present invention.

FIG. 3 is a diagram showing one example of a schematic configuration of the radio communication system according to one Embodiment of the present invention. In the radio communication system 1, it is possible to apply carrier aggregation (CA) to aggregate a plurality of base frequency blocks (component carriers) with a system bandwidth (e.g., 20 MHz) of the LTE system as one unit and/or dual connectivity (DC).

In addition, the radio communication system 1 may be called LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), NR (New Radio), FRA (Future Radio Access), New-RAT (Radio Access Technology) and the like, or may be called the system to actualize the aforementioned system.

The radio communication system 1 is provided with a radio base station 11 for forming a macrocell C1 with relatively wide coverage, and radio base stations 12 (12a to 12c) disposed inside the macrocell C1 to form small cells C2 narrower than the macrocell C1. Further, a user terminal 20 is disposed in the macrocell C1 and each of the small cells C2. The arrangement of each cell and user terminal 20, the numbers thereof and the like are not limited to the aspect shown in the figure.

The user terminal 20 is capable of connecting to both the radio base station 11 and the radio base station 12. The user terminal 20 is assumed to concurrently use the macrocell C1 and small cell C2 using CA or DC. Further, the user terminal 20 may apply CA or DC using a plurality of cells (CCs) (e.g., 5 CCs or less, 6 CCs or more).

The user terminal 20 and radio base station 11 are capable of communicating with each other using carriers (called the existing carrier, legacy carrier and the like) with a narrow bandwidth in a relatively low frequency band (e.g., 2 GHz). On the other hand, the user terminal 20 and radio base station 12 may use carriers with a wide bandwidth in a relatively high frequency band (e.g., 3.5 GHz, 5 GHz, etc.), or may use the same carrier as in the radio base station 11. In addition, the configuration of the frequency band used in each radio base station is not limited thereto.

Further, in each cell, the user terminal 20 may perform communication, using Time Division Duplex (TDD) and/or Frequency Division Duplex (FDD). Furthermore, in each cell (carrier), single numerology may be applied, or a plurality of different kinds of numerology may be applied.

The numerology may be a communication parameter applied to transmission and/or reception of some signal and/or channel, and for example, may indicate at least one of Sub-Carrier Spacing (SCS), bandwidth, symbol length, cyclic prefix length, subframe length, TTI (Transmission Time Interval) length (e.g., slot length), the number of symbols per TTI, radio frame configuration, filtering processing, windowing processing and the like.

The radio base station 11 and radio base station 12 (or, two radio base stations 12) may be connected by cable (e.g., optical fiber in conformity with CPRI (Common Public Radio Interface), X2 interface and the like), or radio.

The radio base station 11 and each of the radio base stations 12 are respectively connected to a higher station apparatus 30, and are connected to a core network 40 via the higher station apparatus 30. In addition, for example, the higher station apparatus 30 includes an access gateway apparatus, Radio Network Controller (RNC), Mobility Management Entity (MME) and the like, but is not limited thereto. Further, each of the radio base stations 12 may be connected to the higher station apparatus 30 via the radio base station 11.

In addition, the radio base station 11 is a radio base station having relatively wide coverage, and may be called a macro base station, collection node, eNB (eNodeB), transmission and reception point and the like. Further, the radio base station 12 is a radio base station having local coverage, and may be called a small base station, micro-base station, pico-base station, femto-base station, HeNB (Home eNodeB), RRH (Remote Radio Head), transmission and reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal (fixed station), as well as the mobile communication terminal (mobile station).

In the radio communication system 1, as radio access schemes, Orthogonal Frequency Division Multiple Access (OFDMA) is applied on downlink, and Single Carrier Frequency Division Multiple Access (SC-FDMA) and/or OFDMA is applied on uplink.

OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of one or contiguous resource blocks for each terminal so that a plurality of terminals uses mutually different bands, and thereby reducing interference among terminals. In addition, uplink and downlink radio access schemes are not limited to the combination of the schemes, and another radio access scheme may be used.

As downlink channels, in the radio communication system 1 are used a downlink shared channel (PDSCH: Physical Downlink Shared Channel) shared by user terminals 20, broadcast channel (PBCH: Physical Broadcast Channel), downlink L1/L2 control channels and the like. User data, higher layer control information, SIB (System Information Block) and the like are transmitted on the PDSCH. Further, MIB (Master Information Block) is transmitted on the PBCH.

The downlink L1/L2 control channel includes PDCCH (Physical Downlink Control Channel), EPDCCH (Enhanced Physical Downlink Control channel), PCFICH (Physical Control Format Indicator Channel), PHICH (Physical Hybrid-ARQ Indicator Channel) and the like. The downlink control information (DCI) including scheduling information of the PDSCH and/or PUSCH and the like is transmitted on the PDCCH.

In addition, the scheduling information may be notified by DCI. For example, DCI for scheduling DL data reception may be called DL assignment, and DCI for scheduling UL data transmission may be called UL grant.

The number of OFDM symbols used in the PDCCH is transmitted on the PCFICH. Receipt confirmation information (e.g., also referred to as retransmission control information, HARQ-ACK, ACK/NACK, and the like) of HARQ (Hybrid Automatic Repeat reQuest) for the PUSCH is transmitted on the PHICH. The EPDCCH is frequency division multiplexed with the PDSCH (downlink shared data channel) to be used in transmitting the DCI and the like as the PDCCH.

As uplink channels, in the radio communication system 1 are used an uplink shared channel (PUSCH: Physical Uplink Shared Channel) shared by user terminals 20, uplink control channel (PUCCH: Physical Uplink Control Channel), random access channel (PRACH: Physical Random Access Channel) and the like. User data, higher layer control information and the like is transmitted on the PUSCH. Further, radio quality information (CQI: Channel Quality Indicator) of downlink, receipt confirmation information, Scheduling Request (SR) and the like are transmitted on the PUCCH. A random access preamble to establish connection with the cell is transmitted on the PRACH.

As downlink reference signals, in the radio communication system 1 are transmitted Cell-specific Reference Signal (CRS), Channel State Information-Reference Signal (CSI-RS), DeModulation Reference Signal (DMRS), Positioning Reference Signal (PRS) and the like. Further, as uplink reference signals, in the radio communication system 1 are transmitted Sounding Reference Signal (SRS), DeModulation Reference Signal (DMRS) and the like. In addition, the DMRS may be called UE-specific Reference Signal. Further, the transmitted reference signals are not limited thereto.

(Radio Base Station)

Figure 4:
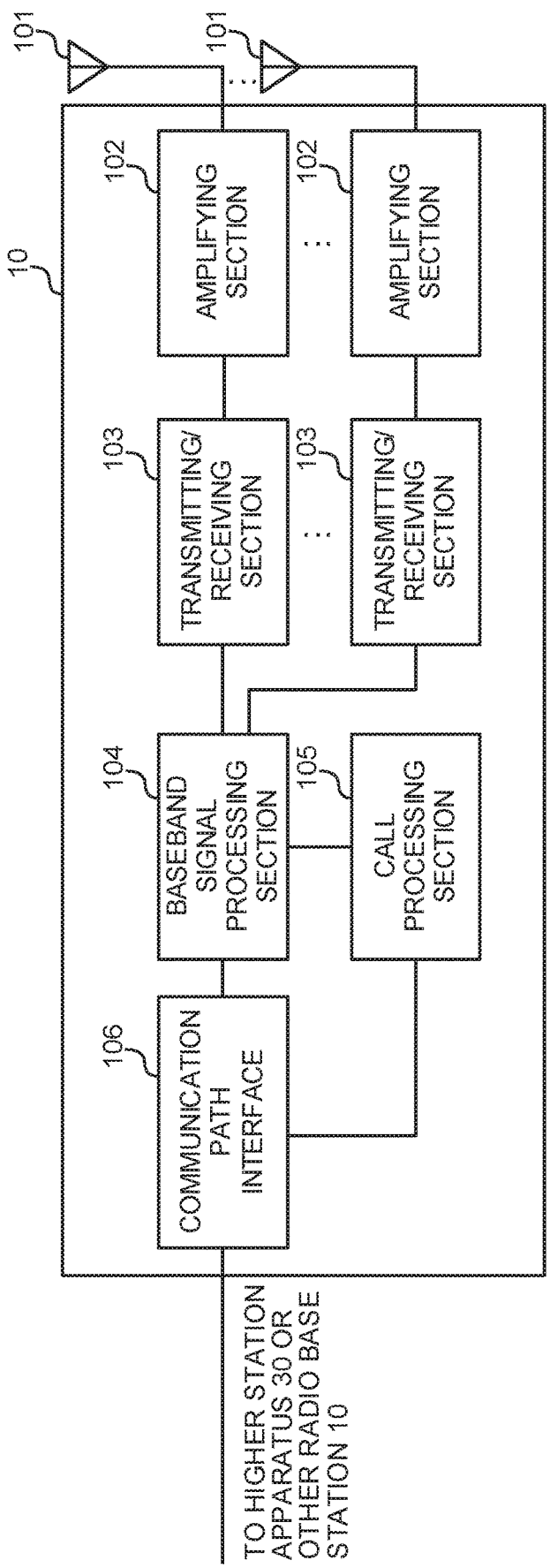
FIG. 4 is a diagram showing one example of an entire configuration of a radio base station according to one Embodiment of the invention.

FIG. 4 is a diagram showing one example of an entire configuration of the radio base station according to one Embodiment of the present invention. The radio base station 10 is provided with a plurality of transmitting/receiving antennas 101, amplifying sections 102, transmitting/receiving sections 103, baseband signal processing section 104, call processing section 105, and communication path interface 106. In addition, with respect to each of the transmitting/receiving antenna 101, amplifying section 102, and transmitting/receiving section 103, the radio base station may be configured to include at least one or more.

User data to transmit to the user terminal 20 from the radio base station 10 on downlink is input to the baseband signal processing section 104 from the higher station apparatus 30 via the communication path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g., transmission processing of HARQ), scheduling, transmission format selection, channel coding, Inverse Fast Fourier Transform (IFFT) processing, and precoding processing to transfer to the transmitting/receiving sections 103. Further, also concerning a downlink control signal, the section 104 performs transmission processing such as channel coding and Inverse Fast Fourier Transform on the signal to transfer to the transmitting/receiving sections 103.

Each of the transmitting/receiving sections 103 converts the baseband signal, which is subjected to precoding for each antenna and is output from the baseband signal processing section 104, into a signal with a radio frequency band to transmit. The radio-frequency signal subjected to frequency conversion in the transmitting/receiving section 103 is amplified in the amplifying section 102, and is transmitted from the transmitting/receiving antenna 101. The transmitting/receiving section 103 is capable of being comprised of a transmitter/receiver, transmitting/receiving circuit or transmitting/receiving apparatus explained based on common recognition in the technical field according to the present invention. In addition, the transmitting/receiving section 103 may be comprised as an integrated transmitting/receiving section, or may be comprised of a transmitting section and receiving section.

On the other hand, for uplink signals, radio-frequency signals received in the transmitting/receiving antennas 101 are amplified in the amplifying sections 102. The transmitting/receiving section 103 receives the uplink signal amplified in the amplifying section 102. The transmitting/receiving section 103 performs frequency conversion on the received signal into a baseband signal to output to the baseband signal processing section 104.

For user data included in the input uplink signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the higher station apparatus 30 via the communication path interface 106. The call processing section 105 performs call processing (setting, releasing, etc.) of a communication channel, state management of the radio base station 10, and management of radio resources.

The communication path interface 106 transmits and receives signals to/from the higher station apparatus 30 via a certain interface. Further, the communication path interface 106 may transmit and receive signals (backhaul signaling) to/from another radio base station 10 via an inter-base station interface (e.g., optical fiber in conformity with CPRI (Common Public Radio Interface), X2 interface).

In addition, the transmitting/receiving section 103 may further have an analog beam forming section for performing analog beam forming. The analog beam forming section may be comprised of an analog beam forming circuit (e.g., phase shifter, phase shift circuit) or analog beam forming apparatus (e.g., phase shift device) explained based on the common recognition in the technical field according to the present invention. Further, for example, the transmitting/receiving antenna 101 may be comprised of an array antenna.

The transmitting/receiving section 103 may receive, from the user terminal 20, a signal which corresponds to an object set specified by a certain power control ID, and which is transmitted using transmit power determined according to a transmit power parameter set specified by the certain power control ID.

Further, the transmitting/receiving section 103 may receive information on the power control ID in use, information on the power control ID to be a premise for PH calculation, PHR and the like.

The transmitting/receiving section 103 may transmit information on the power control ID, object ID, transmit power parameter set ID, object set, object, transmit power parameter set, transmit power parameter or the like, TPC command and the like to the user terminal 20.

Further, the transmitting/receiving section 103 may transmit, to the user terminal 20, information on the correspondence relationship between the object ID and the object set, correspondence relationship between the parameter set ID and the transmit power parameter set, correspondence relationship between the power control ID, and the object ID (object set) and parameter set ID (transmit power parameter set) and the like.

Figure 5:
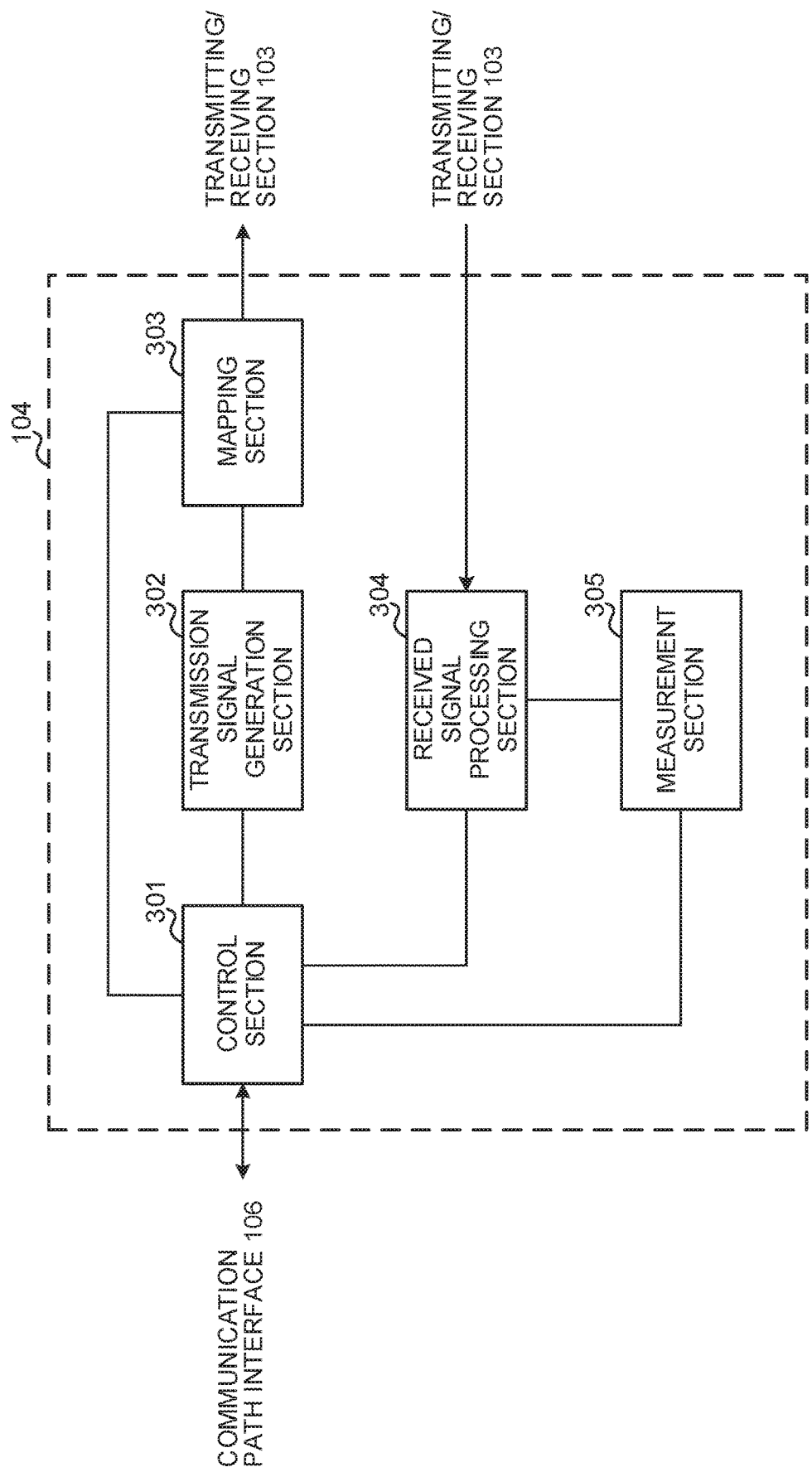
FIG. 5 is a diagram showing one example of a function configuration of the radio base station according to one Embodiment of the invention.

FIG. 5 is a diagram showing one example of a function configuration of the radio base station according to one Embodiment of the present invention. In addition, this example mainly illustrates function blocks of a characteristic portion in this Embodiment, and the radio base station 10 may be assumed to have other function blocks required for radio communication.

The baseband signal processing section 104 is provided with at least a control section (scheduler) 301, transmission signal generating section 302, mapping section 303, received signal processing section 304, and measurement section 305. In addition, these components are essentially included in the radio base station 10, and a part or the whole of the components may not be included in the baseband signal processing section 104.

The control section (scheduler) 301 performs control of the entire radio base station 10. The control section 301 is capable of being comprised of a controller, control circuit or control apparatus explained based on the common recognition in the technical field according to the present invention.

For example, the control section 301 controls generation of signals in the transmission signal generating section 302, allocation of signals in mapping section 303 and the like. Further, the control section 301 controls reception processing of signals in the received signal processing section 304, measurement of signals in the measurement section 305 and the like.

The control section 310 controls scheduling (e.g., resource allocation) of system information, downlink data signal (e.g., signal transmitted on the PDSCH), and downlink control signal (e.g., signal transmitted on the PDCCH and/or EPDCCH. Receipt confirmation information, etc.). Further, based on a result obtained by determining the necessity of retransmission control to the uplink data signal, and the like, the control section 301 controls generation of the downlink control signal, downlink data signal and the like. Furthermore, the control section 301 controls scheduling of the synchronization signal (e.g., PSS (Primary Synchronization Signal)/SSS (Secondary Synchronization Signal), downlink reference signal (e.g., CRS, CSI-RS, DMRS) and the like.

Further, the control section 301 controls scheduling of the uplink data signal (e.g., signal transmitted on the PUSCH), uplink control signal (e.g., signal transmitted on the PUCCH and/or PUSCH. Receipt confirmation information, etc.), random access preamble (e.g., signal transmitted on the PRACH), uplink reference signal and the like.

Furthermore, the control section 301 may perform control for transmitting information for transmit power control to the user terminal 20. For example, the control section 301 may perform control for transmitting information on the correspondence relationship between the object ID and the object set, correspondence relationship between the parameter set ID and the transmit power parameter set, correspondence relationship between the power control ID, and the object ID (object set) and parameter set ID (transmit power parameter set) and the like.

The control section 301 may transmit the transmit power control (TPC) command commonly with respect to a plurality of power control IDs, or may transmit the TPC command independently for each of a plurality of power control IDs.

Based on instructions from the control section 301, the transmission signal generating section 302 generates downlink signals (downlink control signal, downlink data signal, downlink reference signal, etc.) to output to the mapping section 303. The transmission signal generating section 302 is capable of being comprised of a signal generator, signal generating circuit or signal generating apparatus explained based on the common recognition in the technical field according to the present invention.

For example, based on instructions from the control section 301, the transmission signal generating section 302 generates DL assignment for notifying of allocation information of downlink data and/or UL grant for notifying of allocation information of uplink data. Each of the DL assignment and UL grant is DCI, and complies with the DCI format. Further, the downlink data signal is subjected to coding processing and modulation processing, according to a coding rate, modulation scheme and the like determined based on the channel state information (CSI) and the like from each user terminal 20.

Based on instructions from the control section 301, the mapping section 303 maps the downlink signal generated in the transmission signal generating section 302 to certain radio resources to output to the transmitting/receiving section 103. The mapping section 303 is capable of being comprised of a mapper, mapping circuit or mapping apparatus explained based on the common recognition in the technical field according to the present invention.

The received signal processing section 304 performs reception processing (e.g., demapping, demodulation, decoding, etc.) on the received signal input from the transmitting/receiving section 103. Herein, for example, the received signal is the uplink signal (uplink control signal, uplink data signal, uplink reference signal, etc.) transmitted from the user terminal 20. The received signal processing section 304 is capable of being comprised of a signal processor, signal processing circuit or signal processing apparatus explained based on the common recognition in the technical field according to the present invention.

The received signal processing section 304 outputs the information decoded by the reception processing to the control section 301. For example, in the case of receiving the PUCCH including HARQ-ACK, the section 304 outputs HARQ-ACK to the control section 301. Further, the received signal processing section 304 outputs the received signal and/or signal subjected to the reception processing to the measurement section 305.

The measurement section 305 performs measurement on the received signal. The measurement section 305 is capable of being comprised of a measurement device, measurement circuit or measurement apparatus explained based on the common recognition in the technical field according to the present invention.

For example, based on the received signal, the measurement section 305 may perform RRM (Radio Resource Measurement) measurement, CSI (Channel State Information) measurement and the like. The measurement section 305 may measure received power (e.g., RSRP (Reference Signal Received Power)), received quality (e.g., RSRQ (Reference Signal Received Quality), SINR (Signal to Interference plus Noise Ratio), SNR (Signal to Noise Ratio)), signal strength (e.g., RSSI (Received Signal Strength Indicator)), propagation path information (e.g., CSI), and the like. The measurement result may be output to the control section 301.

(User Terminal)

Figure 6:
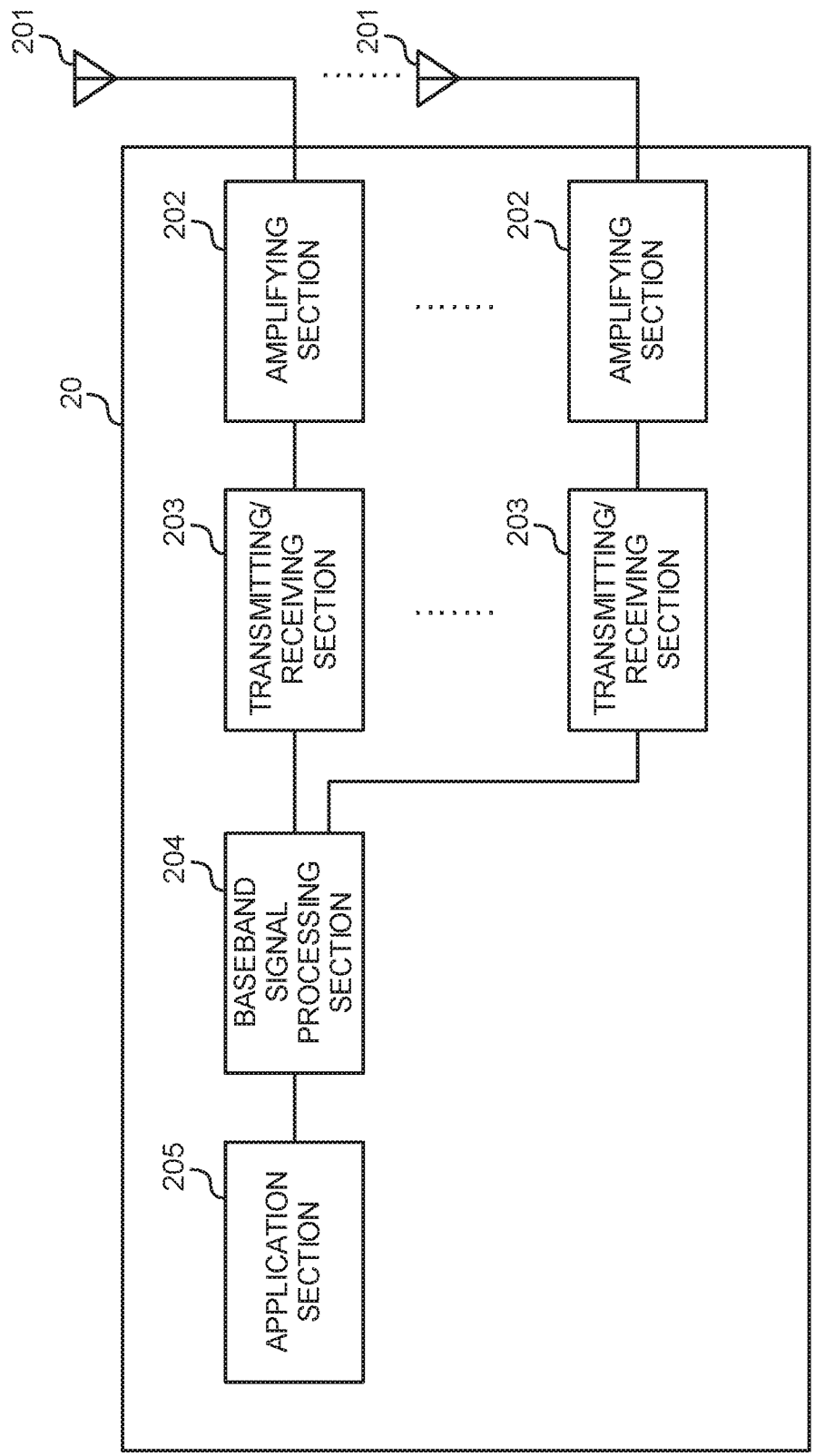
FIG. 6 is a diagram showing one example of an entire configuration of a user terminal according to one Embodiment of the invention.

FIG. 6 is a diagram showing one example of an entire configuration of the user terminal according to one Embodiment of the present invention. The user terminal 20 is provided with a plurality of transmitting/receiving antennas 201, amplifying sections 202, transmitting/receiving sections 203, baseband signal processing section 204, and application section 205. In addition, with respect to each of the transmitting/receiving antenna 201, amplifying section 202, and transmitting/receiving section 203, the user terminal may be configured to include at least one or more.

Radio-frequency signals received in the transmitting/receiving antennas 201 are respectively amplified in the amplifying sections 202. Each of the transmitting/receiving sections 203 receives the downlink signal amplified in the amplifying section 202. The transmitting/receiving section 203 performs frequency conversion on the received signal into a baseband signal to output to the baseband signal processing section 204. The transmitting/receiving section 203 is capable of being comprised of a transmitter/receiver, transmitting/receiving circuit or transmitting/receiving apparatus explained based on the common recognition in the technical field according to the present invention. In addition, the transmitting/receiving section 203 may be comprised as an integrated transmitting/receiving section, or may be comprised of a transmitting section and receiving section.

The baseband signal processing section 204 performs FFT processing, error correcting decoding, reception processing of retransmission control and the like on the input baseband signal. User data on downlink is transferred to the application section 205. The application section 205 performs processing concerning layers higher than the physical layer and MAC layer, and the like. Further, among the downlink data, broadcast information may be also transferred to the application section 205.

On the other hand, for user data on uplink, the data is input to the baseband signal processing section 204 from the application section 205. The baseband signal processing section 204 performs transmission processing of retransmission control (e.g., transmission processing of HARQ), channel coding, precoding, Discrete Fourier Transform (DFT) processing, IFFT processing and the like to transfer to each of the transmitting/receiving sections 203. Each of the transmitting/receiving sections 203 converts the baseband signal output from the baseband signal processing section 204 into a signal with a radio frequency band to transmit. The radio-frequency signals subjected to frequency conversion in the transmitting/receiving sections 203 are amplified in the amplifying sections 202, and are transmitted from the transmitting/receiving antennas 201, respectively.

In addition, the transmitting/receiving section 203 may further have an analog beam forming section for performing analog beam forming. The analog beam forming section may be comprised of an analog beam forming circuit (e.g., phase shifter, phase shift circuit) or analog beam forming apparatus (e.g., phase shift device) explained based on the common recognition in the technical field according to the present invention. Further, for example, the transmitting/receiving antenna 201 may be comprised of an array antenna.

The transmitting/receiving section 203 may transmit a signal which corresponds to an object set specified by a certain power control ID to the radio base station 10, using transmit power determined according to a transmit power parameter set specified by the certain power control ID.

Further, the transmitting/receiving section 203 may transmit information on the power control ID in use, information on the power control ID to be a premise for PH calculation, PHR and the like.

The transmitting/receiving section 203 may receive information on the power control ID, object ID, transmit power parameter set ID, object set, object, transmit power parameter set, transmit power parameter or the like, TPC command and the like from the radio base station 10.

Further, the transmitting/receiving section 203 may receive, from the radio base station 10, information on the correspondence relationship between the object ID and the object set, correspondence relationship between the parameter set ID and the transmit power parameter set, correspondence relationship between the power control ID, and the object ID (object set) and parameter set ID (transmit power parameter set) and the like.

Figure 7:
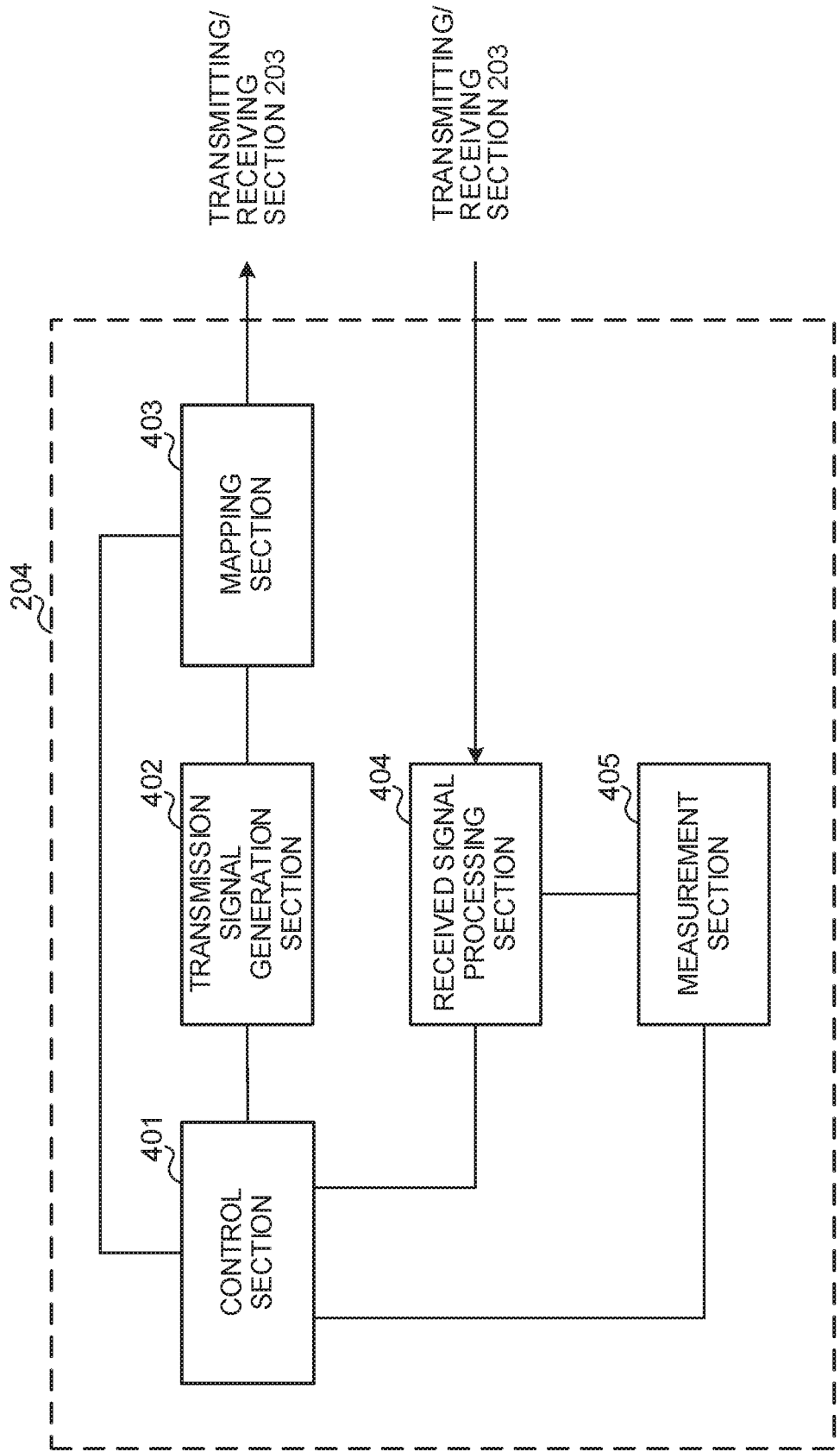
FIG. 7 is a diagram showing one example of a function configuration of the user terminal according to one Embodiment of the invention.

FIG. 7 is a diagram showing one example of a function configuration of the user terminal according to one Embodiment of the present invention. In addition, this example mainly illustrates function blocks of a characteristic portion in this Embodiment, and the user terminal 20 may be assumed to have other function blocks required for radio communication.

The baseband signal processing section 204 that the user terminal 20 has is provided with at least a control section 401, transmission signal generating section 402, mapping section 403, received signal processing section 404, and measurement section 405. In addition, these components are essentially included in the user terminal 20, and a part or the whole of the components may not be included in the baseband signal processing section 204.

The control section 401 performs control of the entire user terminal 20. The control section 401 is capable of being comprised of a controller, control circuit or control apparatus explained based on the common recognition in the technical field according to the present invention.

For example, the control section 401 controls generation of signals in the transmission signal generating section 402, allocation of signals in the mapping section 403 and the like. Further, the control section 401 controls reception processing of signals in the received signal processing section 404, measurement of signals in the measurement section 405 and the like.

The control section 401 acquires the downlink control signal and downlink data signal transmitted from the radio base station 10, from the received signal processing section 404. Based on the downlink control signal and/or a result obtained by determining the necessity of retransmission control to the downlink data signal, and the like, the control section 401 controls generation of an uplink control signal and uplink data signal.

Further, the control section 401 may perform transmit power control of a signal to be transmitted. For example, the control section 401 may perform independent transmit power control for each power control ID. Furthermore, the control section 401 may perform common transmit power control to a plurality of power control IDs.

The control section 401 may perform control for transmitting a signal that corresponds to an object set specified by a certain power control ID, using transmit power determined according to a transmit power parameter set specified by the certain power control ID.

It is preferable that the object set includes at least two of the beam, waveform, layer, layer group, panel, beam group, beam pair link, service type, numerology, frequency and service type. In addition, the "waveform" may be read with "signal of waveform", "signal according to the waveform", "waveform of a signal" and the like.

In addition, the control section 401 may acquire the power control ID from the received signal processing section 404, or may derive the power control ID, based on the object ID, transmit power parameter set ID and the like acquired from the received signal processing section 404. Further, the control section 401 may derive the power control ID, based on at least one of the configured (notified) object set, object, transmit power parameter set and transmit power parameter.

Based on information notified from the radio base station 10, information specified by specifications and the like, the control section 401 may determine the correspondence relationship between the object ID and the object set, correspondence relationship between the parameter set ID and the transmit power parameter set, correspondence relationship between the power control ID, and the object ID (object set) and parameter set ID (transmit power parameter set) and the like to perform power control of the transmission signal.

In addition, the control section 401 may directly derive the relationship between the object set and the transmit power parameter set, without through the power control ID.

Further, for a plurality of power control IDs, the control section 401 may store (keep) independently correction values based on transmit power control (TPC) commands.

In the case of receiving (acquiring, from the received signal processing section 404), a power control ID different from the power control ID currently used, the control section 401 may reset a correction value based on the TPC command, or may continue (may not reset) the value.

In the case where the correction value that corresponds to some (one or more) or particular power control ID is reset, the control section 401 may reset a correction value that corresponds to the other power control ID. In addition, reset of the cumulative value may be called reset of cumulative.

Further, the control section 401 may calculate PH on the premise (on the assumption) of transmit power control based on a particular power control ID, and control for transmitting PHR indicative of the PH. Irrespective of the power control ID that corresponds to the signal in transmission, the control section 401 may perform calculation of the PH on the premise of the particular power control ID.

Furthermore, in the case of acquiring various kinds of information notified from the radio base station 10, from the received signal processing section 404, the control section 401 may update the parameter used in control based on the information.

Based on instructions from the control section 401, the transmission signal generating section 402 generates uplink signals (uplink control signal, uplink data signal, uplink reference signal, etc.) to output to the mapping section 403. The transmission signal generating section 402 is capable of being comprised of a signal generator, signal generating circuit or signal generating apparatus explained based on the common recognition in the technical field according to the present invention.

For example, based on instructions from the control section 401, the transmission signal generating section 402 generates the uplink control signal concerning receipt confirmation information, channel state information (CSI) and the like. Further, based on instructions from the control section 401, the transmission signal generating section 402 generates the uplink data signal. For example, when the downlink control signal notified from the radio base station 10 includes the UL grant, the transmission signal generating section 402 is instructed to generate the uplink data signal from the control section 401.

Based on instructions from the control section 401, the mapping section 403 maps the uplink signal generated in the transmission signal generating section 402 to radio resources to output to the transmitting/receiving section 203. The mapping section 403 is capable of being comprised of a mapper, mapping circuit or mapping apparatus explained based on the common recognition in the technical field according to the present invention.

The received signal processing section 404 performs reception processing (e.g., demapping, demodulation, decoding, etc.) on the received signal input from the transmitting/receiving section 203. Herein, for example, the received signal is the downlink signal (downlink control signal, downlink data signal, downlink reference signal, etc.) transmitted from the radio base station 10. The received signal processing section 404 is capable of being comprised of a signal processor, signal processing circuit or signal processing apparatus explained based on the common recognition in the technical field according to the present invention. Further, the received signal processing section 404 is capable of constituting the receiving section according to the present invention.

The received signal processing section 404 outputs the information decoded by the reception processing to the control section 401. For example, the received signal processing section 404 outputs the broadcast information, system information, RRC signaling, DCI and the like to the control section 401. Further, the received signal processing section 404 outputs the received signal and/or signal subjected to the reception processing to the measurement section 405.

The measurement section 405 performs measurement on the received signal. The measurement section 405 is capable of being comprised of a measurement device, measurement circuit or measurement apparatus explained based on the common recognition in the technical field according to the present invention.

For example, based on the received signal, the measurement section 405 may perform RRM measurement, CSI measurement and the like. The measurement section 405 may measure received power (e.g., RSRP), received quality (e.g., RSRQ, SINR, SNR), signal strength (e.g., RSSI), propagation path information (e.g., CSI), and the like. The measurement result may be output to the control section 401.

(Hardware Configuration)

In addition, the block diagrams used in explanation of the above-mentioned Embodiment show blocks on a function-by-function basis. These function blocks (configuration sections) are actualized by any combination of hardware and/or software. Further, the method of actualizing each function block is not limited particularly. In other words, each function block may be actualized using a single apparatus combined physically and/or logically, or two or more apparatuses that are separated physically and/or logically are connected directly and/or indirectly (e.g., using cable and/or radio), and each function block may be actualized using a plurality of these apparatuses.

Figure 8:
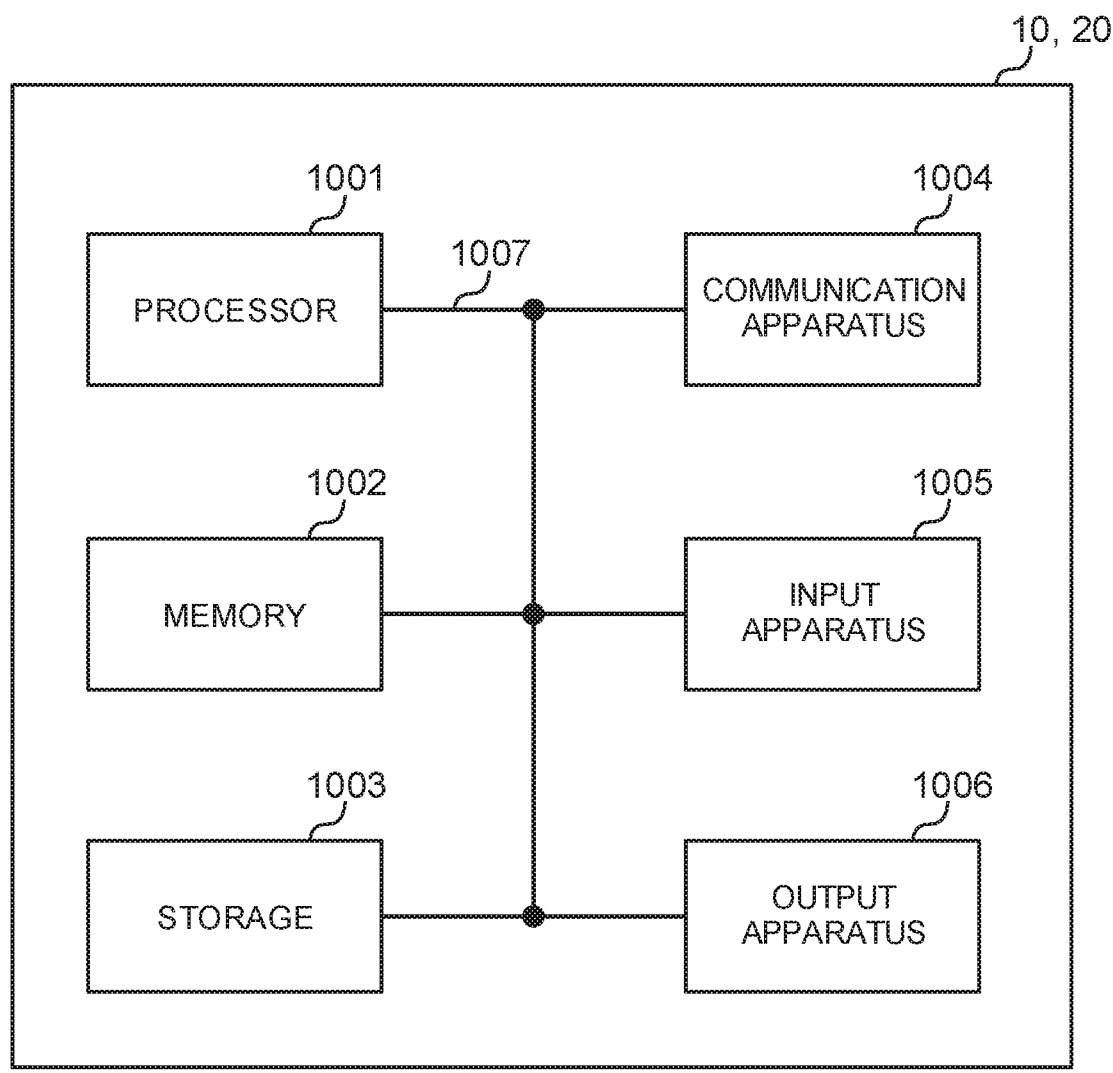
FIG. 8 is a diagram showing one example of hardware configurations of the radio base station and user terminal according to one Embodiment of the invention.

For example, each of the radio base station, user terminal and the like in one Embodiment of the present invention may function as a computer that performs the processing of the radio communication method of the invention. FIG. 8 is a diagram showing one example of a hardware configuration of each of the radio base station and user terminal according to one Embodiment of the invention. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each of apparatuses shown in the figure, the hardware configuration of each of the radio base station 10 and the user terminal 20 may be configured so as to include one or a plurality of the apparatuses, or may be configured without including a part of the apparatuses.

For example, a single processor 1001 is shown in the figure, but a plurality of processors may exist. Further, the processing may be executed by a single processor, or may be executed by one or more processors at the same time, sequentially or using another technique. In addition, the processor 1001 may be implemented on one or more chips.

For example, each function in the radio base station 10 and user terminal 20 is actualized in a manner such that certain software (program) is read on the hardware of the processor 1001, memory 1002 and the like, and that the processor 1001 thereby performs computations, and controls communication via the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing section 105 and the like may be actualized by the processor 1001.

Further, the processor 1001 reads the program (program code), software module, data and the like on the memory 1002 from the storage 1003 and/or the communication apparatus 1004, and according thereto, executes various kinds of processing. Used as the program is a program that causes the computer to execute at least a part of operation described in the above-mentioned Embodiment. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of ROM (Read Only Memory), EPROM (Erasable Programmable ROM), EEPROM (Electrically EPROM), RAM (Random Access Memory) and other proper storage media. The memory 1002 may be called the register, cache, main memory (main storage apparatus) and the like. The memory 1002 is capable of storing the program (program code), software module and the like executable to implement the radio communication method according to one Embodiment of the present invention.

The storage 1003 is a computer-readable storage medium, and for example, may be comprised of at least one of a flexible disk, floppy (Registered Trademark) disk, magneto-optical disk (e.g., compact disk (CD-ROM (Compact Disc ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via a wired and/or wireless network, and for example, is also referred to as a network device, network controller, network card, communication module and the like. For example, in order to actualize Frequency Division Duplex (FDD) and/or Time Division Duplex (TDD), the communication apparatus 1004 may be comprised by including a high-frequency switch, duplexer, filter, frequency synthesizer and the like. For example, the transmitting/receiving antenna 101 (201), amplifying section 102 (202), transmitting/receiving section 103 (203), communication path interface 106 and the like as described above may be actualized by the communication apparatus 1004.

The input apparatus 1005 is an input device (e.g., keyboard, mouse, microphone, switch, button, sensor, etc.) that receives input from the outside. The output apparatus 1006 is an output device (e.g., display, speaker, LED (Light Emitting Diode) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be configured using a single bus, or may be configured using different buses every inter-apparatus.

Furthermore, each of the radio base station 10 and user terminal 20 may be configured by including hardware such as a microprocessor, Digital Signal Processor (DSP), ASIC (ApplicatioN Specific Integrated Circuit), PLD (Programmable Logic Device), and FPGA (Field Programmable Gate Array), or a part or the whole of each function block may be actualized using the hardware. For example, the processor 1001 may be implemented using at least one of the hardware.

(Modification)

In addition, the term explained in the present Description and/or the term required to understand the present Description may be replaced with a term having the same or similar meaning. For example, the channel and/or the symbol may be a signal (signaling). Further, the signal may be a message. The reference signal is capable of being abbreviated as RS (Reference Signal), and according to the standard to apply, may be called a pilot, pilot signal and the like. Furthermore, a component carrier (CC) may be called a cell, frequency carrier, carrier frequency and the like.

Further, the radio frame may be comprised of one or a plurality of frames in the time domain. The one or the plurality of frames constituting the radio frame may be called a subframe. Furthermore, the subframe may be comprised of one or a plurality of slots in the time domain. The subframe may be a fixed time length (e.g., 1 ms) that is not dependent on numerology.

Furthermore, the slot may be comprised of one or a plurality of symbols (OFDM (Orthogonal Frequency Division Multiplexing) symbols, SC-FDMA (Single Carrier Frequency Division Multiple Access) symbols and the like) in the time domain. Still furthermore, the slot may a time unit based on numerology. Moreover, the slot may include a plurality of mini-slots. Each mini-slot may be comprised of one or a plurality of symbols in the time domain. Further, the mini-slot may be called a subslot.

Each of the radio frame, subframe, slot, mini-slot and symbol represents a time unit in transmitting a signal. For the radio frame, subframe, slot, mini-slot and symbol, another name corresponding to each of them may be used. For example, one subframe may be called Transmission Time Interval (TTI), a plurality of contiguous subframes may be called TTI, or one slot or one mini-slot may be called TTI. In other words, the subframe and/or TTI may be the subframe (1 ms) in existing LTE, may be a frame (e.g., 1 to 13 symbols) shorter than 1 ms, or may be a frame longer than 1 ms. In addition, instead of the subframe, the unit representing the TTI may be called the slot, mini-slot and the like.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto.

The TTI may be a transmission time unit of a data packet (transport block) subjected to channel coding, code block and/or codeword, or may be a processing unit of scheduling, link adaptation and the like. In addition, when the TTI is given, a time segment (e.g., the number of symbols) to which the transport block, code block and/or codeword is actually mapped may be shorter than the TTI.

In addition, when one slot or one mini-slot is called the TTI, one or more TTIs (i.e., one or more slots, or one or more mini-slots) may be the minimum time unit of scheduling. Further, the number of slots (the number of mini-slots) constituting the minimum time unit of scheduling may be controlled.

The TTI having a time length of 1 ms may be called ordinary TTI (TTI in LTE Rel.8-12), normal TTI, long TTI, ordinary subframe, normal subframe, long subframe or the like. The TTI shorter than the ordinary TTI may be called reduced TTI, short TTI, partial or fractional TTI, reduced subframe, short subframe, mini-slot, subslot or the like.

In addition, the long TTI (e.g., normal TTI, subframe, etc.) may be read with TTI having a time length exceeding 1 ms, and the short TTI (e.g., reduced TTI, etc.) may be read with TTI having a TTI length of 1 ms or more and less than the TTI length of the long TTI.

The resource block (RB) is a resource allocation unit in the time domain and frequency domain, and may include one or a plurality of contiguous subcarriers in the frequency domain. Further, the RB may include one or a plurality of symbols in the time domain, and may be a length of 1 slot, 1 mini-slot, 1 subframe, or 1 TTI. Each of 1 TTI and 1 subframe may be comprised of one or a plurality of resource blocks. In addition, one or a plurality of RBs may be called a physical resource block (PRB: Physical RB), subcarrier group (SCG: Sub-Carrier Group), Resource Element Group (REG), PRB pair, RB pair and the like.

Further, the resource block may be comprised of one or a plurality of resource elements (RE: Resource Element). For example, 1 RE may be a radio resource region of 1 subcarrier and 1 symbol.

In addition, structures of the above-mentioned radio frame, subframe, slot, mini-slot, symbol and the like are only illustrative. For example, it is possible to modify, in various manners, configurations of the number of subframes included in the radio frame, the number of slots per subframe or radio frame, the number of mini-slots included inside the slot, the numbers of symbols and RBs included in the slot or mini-slot, the number of subcarriers included in the RB, the number of symbols within the TTI, the symbol length, the cyclic prefix (CP) length and the like.

Further, the information, parameter and the like explained in the present Description may be expressed using an absolute value, may be expressed using a relative value from a certain value, or may be expressed using another corresponding information. For example, the radio resource may be indicated by a certain index.

The names used in the parameter and the like in the present Description are not restrictive names in any respects. For example, it is possible to identify various channels (PUCCH (Physical Uplink Control Channel), PDCCH (Physical Downlink Control Channel) and the like) and information elements, by any suitable names, and therefore, various names assigned to these various channels and information elements are not restrictive names in any respects.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output from a higher layer to a lower layer, and/or from the lower layer to the higher layer. The information, signal and the like may be input and output via a plurality of network nodes.

The input/output information, signal and the like may be stored in a particular place (e.g., memory), or may be managed using a management table. The input/output information, signal and the like are capable of being rewritten, updated or edited. The output information, signal and the like may be deleted. The input information, signal and the like may be transmitted to another apparatus.

Notification of the information is not limited to the Aspect/Embodiments described in the present Description, and may be performed using another method. For example, notification of the information may be performed using physical layer signaling (e.g., Downlink Control Information (DCI), Uplink Control Information (UCI)), higher layer signaling (e.g., RRC (Radio Resource Control) signaling, broadcast information (Master Information Block (MIB), System Information Block (SIB) and the like), MAC (Medium Access Control) signaling), other signals, or combination thereof.

In addition, the physical layer signaling may be called L1/L2 (Layer 1/Layer 2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified using MAC Control Element (MAC CE).

Further, notification of certain information (e.g., notification of "being X") is not limited to explicit notification, and may be performed implicitly (e.g., notification of the certain information is not performed, or by notification of different information).

The decision may be made with a value ("0" or "1") expressed by 1 bit, may be made with a Boolean value represented by true or false, or may be made by comparison with a numerical value (e.g., comparison with a certain value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

The terms of "system" and "network" used in the present Description are used interchangeably.

In the present Description, the terms of "Base Station (BS)", "radio base station", "eNB", "gNB", "cell", "sector", "cell group", "carrier" and "component carrier" are capable of being used interchangeably. There is the case where the base station is called by the terms of fixed station, NodeB, eNodeB (eNB), access point, transmission point, femto-cell, small cell and the like.

The base station is capable of accommodating one or a plurality of (e.g., three) cells (also called the sector). When the base station accommodates a plurality of cells, the entire coverage area of the base station is capable of being divided into a plurality of smaller areas, and each of the smaller areas is also capable of providing communication services by a base station sub-system (e.g., small base station (RRH: Remote Radio Head) for indoor use). The term of "cell" or "sector" refers to a part or the whole of coverage area of the base station and/or base station sub-system that performs communication services in the coverage.

In the present Description, the terms of "Mobile Station (MS)", "user terminal", "User Equipment (UE)", and "terminal" are capable of being used interchangeably. There is the case where the base station is called by the terms of fixed station, NodeB, eNodeB (eNB), access point, transmission point, reception point, femto-cell, small cell and the like.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms, by a person skilled in the art.

Further, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

In the present Description, operation performed by the base station may be performed by an upper node thereof in some case. In a network including one or a plurality of network nodes having the base station, it is obvious that various operations performed for communication with the terminal are capable of being performed by the base station, one or more network nodes (e.g., MME (Mobility Management Entity), S-GW (Serving-Gateway) and the like are considered, but the invention is not limited thereto) except the base station, or combination thereof.

Each Aspect/Embodiment explained in the present Description may be used alone, may be used in combination, or may be switched and used according to execution. Further, with respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

Each Aspect/Embodiment explained in the present Description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Registered Trademark) (Global System for Mobile communications), CDMA 2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), system using another proper radio communication method and/or the next-generation system extended based thereon.

The description of "based on" used in the present Description does not mean "based on only", unless otherwise specified. In other words, the description of "based on" means both of "based on only" and "based on at least".

Any references to elements using designations of "first", "second" and the like used in the present Description do not limit the amount or order of these elements overall. These designations are capable of being used in the present Description as the useful method to distinguish between two or more elements. Accordingly, references of first and second elements do not mean that only two elements are capable of being adopted, or that the first element should be prior to the second element in any manner.

There is the case where the term of "determining" used in the present Description includes various types of operation. For example, "determining" may be regarded as "determining" calculating, computing, processing, deriving, investigating, looking up (e.g., search in a table, database or another data structure), ascertaining and the like. Further, "determining" may be regarded as "determining" receiving (e.g., receiving information), transmitting (e.g., transmitting information), input, output, accessing (e.g., accessing data in memory) and the like. Furthermore, "determining" may be regarded as "determining" resolving, selecting, choosing, establishing, comparing and the like. In other words, "determining" may be regarded as "determining" some operation.

The terms of "connected" and "coupled" used in the present Description or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. For example, "connection" may be read with "access".

In the present Description, in the case where two elements are connected, it is possible to consider that two elements are mutually "connected" or "coupled", by using one or more electric wires, cable and/or print electric connection, and as some non-limited and non-inclusive examples, electromagnetic energy having wavelengths in a radio frequency region, microwave region and/or light (both visible and invisible) region, or the like.

In the present Description, the term of "A and B are different from each other" may mean that "A and B are mutually different". The terms of "separate", "coupled" and the like may be interpreted similarly.

In the present Description or the scope of the claims, in the case of using "including", "comprising" and modifications thereof, as in the term of "provided with", these terms are intended to be inclusive. Further, the term of "or" used in the present Description or the scope of the claims is intended to be not exclusive OR.

As described above, the present invention is described in detail, but it is obvious to a person skilled in the art that the invention is not limited to the Embodiments described in the present Description. The invention is capable of being carried into practice as modified and changed aspects without departing from the subject matter and scope of the invention defined based on the descriptions of the scope of the claims. Accordingly, the descriptions of the present Description are intended for illustrative explanation, and do not have any restrictive meaning to the invention.

The invention claimed is:

1. A terminal comprising:
a receiver that receives an indicator related to power control;
a controller that controls a transmission power in accordance with a transmission power parameter set specified by a first index associated with the indicator, the transmission power parameter set including values of parameters used in transmit power control; and
a transmitter that transmits at least one of a signal and a channel corresponding to an object set specified by a second index associated with the indicator, using the transmission power,
wherein the object set includes at least one value representing one or more objects which are at least one of a beam, a layer, a layer group, a panel, a beam group, a beam pair link, a numerology, a frequency, a code, and a sequence.

2. The terminal according to claim 1, wherein the controller independently stores a correction value, based on a transmission power control command, for each indicator in a plurality of the indicators.

3. The terminal according to claim 1, wherein the controller resets a correction value based on a transmission power control command, if the indicator that is received is different to the indicator that is currently being used.

4. The terminal according to claim 1, wherein the controller continues to use a correction value based on a transmission power control command, if the indicator that is received is different to the indicator that is currently being used.

5. A radio communication method for a terminal comprising:
receiving an indicator related to power control;
controlling a transmission power in accordance with a transmission power parameter set specified by a first index associated with the indicator, the transmission power parameter set including values of parameters used in transmit power control; and
transmitting at least one of a signal and a channel corresponding to an object set specified by a second index associated with the indicator, using the transmission power,
wherein the object set includes at least one value representing one or more objects which are at least one of a beam, a layer, a layer group, a panel, a beam group, a beam pair link, a numerology, a frequency, a code, and a sequence.

6. A base station comprising:
a transmitter that transmits, to a terminal, an indicator related to power control; and
a receiver that receives at least one of a signal and a channel corresponding to an object set specified by a second index associated with the indicator, transmitted by the terminal using a transmission power controlled in accordance with a transmission power parameter set specified by a first index associated with the indicator, the transmission power parameter set including values of parameters used in transmit power control,
wherein the object set includes at least one value representing one or more objects which are at least one of a beam, a layer, a layer group, a panel, a beam group, a beam pair link, a numerology, a frequency, a code, and a sequence.

7. A system comprising:
a terminal that comprises:
   a receiver that receives an indicator related to power control;
   a controller that controls a transmission power in accordance with a transmission power parameter set specified by a first index associated with the indicator, the transmission power parameter set including values of parameters used in transmit power control; and
   a transmitter that transmits at least one of a signal and a channel corresponding to an object set specified by a second index associated with the indicator, using the transmission power,
   wherein the object set includes at least one value representing one or more objects which are at least one of a beam, a layer, a layer group, a panel, a beam group, a beam pair link, a numerology, a frequency, a code, and a sequence; and
a base station that comprises:
   a transmitter that transmits, to the terminal, the indicator; and
   a receiver that receives the at least one of the signal and the channel.

* * * * *